United States Patent
Neumann et al.

(10) Patent No.: US 9,832,018 B2
(45) Date of Patent: Nov. 28, 2017

(54) METHOD OF GENERATING A PUBLIC KEY FOR AN ELECTRONIC DEVICE AND ELECTRONIC DEVICE

(71) Applicant: NXP B.V., Eindhoven (NL)

(72) Inventors: Heike Neumann, Hamburg (DE); Paul Hubmer, Hart-Purgstall (AT)

(73) Assignee: NXP B.V., Eindhoven (NL)

( * ) Notice: Subject to any disclaimer, the term of this patent is extended or adjusted under 35 U.S.C. 154(b) by 126 days.

(21) Appl. No.: 14/622,774

(22) Filed: Feb. 13, 2015

(65) Prior Publication Data

US 2015/0163059 A1    Jun. 11, 2015

Related U.S. Application Data

(63) Continuation of application No. 12/601,266, filed as application No. PCT/IB2008/051634 on Apr. 28, 2008, now Pat. No. 8,958,563.

(30) Foreign Application Priority Data

Jun. 11, 2007 (EP) .................................... 07109971

(51) Int. Cl.
| | | |
|---|---|---|
| *H04L 9/30* | (2006.01) | |
| *H04L 9/08* | (2006.01) | |
| *H04L 9/32* | (2006.01) | |

(52) U.S. Cl.
CPC .............. *H04L 9/30* (2013.01); *H04L 9/0816* (2013.01); *H04L 9/0866* (2013.01); *H04L 9/3013* (2013.01); *H04L 9/3218* (2013.01); *H04L 9/3234* (2013.01); *H04L 2209/24* (2013.01)

(58) Field of Classification Search
CPC ....... H04L 9/30; H04L 9/0816; H04L 9/3234; H04L 9/0866; H04L 9/3218; H04L 9/3013; H04L 2209/24
See application file for complete search history.

(56) References Cited

U.S. PATENT DOCUMENTS

| | | | | |
|---|---|---|---|---|
| 6,005,943 A  * | 12/1999 | Cohen | ................... | H04L 9/0877 380/30 |
| 6,169,803 B1 * | 1/2001 | Sako | ...................... | G06Q 20/20 380/200 |
| 7,239,704 B1 * | 7/2007 | Maillard | ............... | H04L 9/0822 348/E5.004 |
| 8,645,712 B1 * | 2/2014 | Langhammer | ........ | H04L 9/0841 713/176 |
| 8,958,563 B2 * | 2/2015 | Neumann | ............. | H04L 9/0866 380/282 |
| 2005/0160259 A1 * | 7/2005 | Ogura | ....................... | H04L 9/00 713/156 |
| 2006/0215837 A1 * | 9/2006 | Chen | ..................... | H04L 9/0847 380/44 |
| 2006/0282901 A1 * | 12/2006 | Li | ......................... | G06F 21/606 726/26 |
| 2008/0114984 A1 * | 5/2008 | Srinivasan | ............. | G06F 21/73 713/175 |

* cited by examiner

*Primary Examiner* — Matthew Smithers

(57) ABSTRACT

A method for generating a public key for an electronic device is provided, wherein the method comprises generating a public key 103 based on a private key and a unique identifier associated with the electronic device 200.

14 Claims, 2 Drawing Sheets

METHOD OF GENERATING A PUBLIC KEY FOR AN ELECTRONIC DEVICE AND ELECTRONIC DEVICE

CROSS-REFERENCE TO RELATED APPLICATIONS

This application is a Continuation of, and claims priority to, U.S. application Ser. No. 12/601,266 filed on Nov. 22, 2009, entitled "METHOD OF GENERATING A PUBLIC KEY FOR AN ELECTRONIC DEVICE AND ELECTRONIC DEVICE", which claims priority to PCT Application No. PCT/IB2008/051634 filed on Apr. 28, 2008, which claims priority to EP Patent Application 07109971.7 filed on Jun. 11, 2007.

FIELD OF THE INVENTION

The invention relates to method of generating a public key.

The invention further relates to an electronic device, in particular to a security token.

Further, the invention relates to an authentication method.

Moreover, the invention relates to a program element.

Furthermore, the invention relates to a computer-readable medium.

BACKGROUND OF THE INVENTION

For many applications such as electronic ticketing, transport or digital access control systems security tokens are used to store relevant or security information. Often the security partly relies on the fact that the security token is authentic, i.e. that a specific piece of hardware is used and the transaction is not simulated by a PC or any other electronic device. Especially for transport applications, the copy protection for tickets is implemented in a way that relies on the fact that only a certain kind of security tokens can provide a serial number of a special form under rather restrictive physical circumstances.

In general, it is not difficult to clone these security tokens by a Field Programmable Gate Array (FPGA), but the costs of cloning usually exceed the benefit of the attack.

To increase the level of security against cloning attacks a cryptographic proof of authenticity is one option. Due to the lack of an existing symmetric key infrastructure and the complex key management a cryptographic proof using asymmetric primitives is the generic solution. Such protocols based on asymmetric primitives can be implemented over a mathematical group where the discrete logarithm problem is hard to solve. In this mathematical group a base element or base point g is chosen which can be then used in the algorithm, e.g. for generating a public key or for authentication of the respective security token.

OBJECT AND SUMMARY OF THE INVENTION

It may be an object of the invention to provide an alternative method for providing a public key and/or base point for an authentication algorithm.

In order to achieve the object defined above, a method of generating a public key, an electronic device, in particular a security token, an authentication method, a program element, and a computer-readable medium according to the independent claims are provided.

According to an exemplary embodiment of the invention a method for generating a public key for an electronic device is provided, wherein the method comprises generating a public key based on a private key and a unique identifier associated with the electronic device.

According to an exemplary embodiment an electronic device comprises a memory, wherein the memory is adapted to store a public key according to an exemplary embodiment of the invention. In particular, the public key may be stored in the memory.

According to an exemplary embodiment a method of authenticating an electronic device comprises generating a public key according to an exemplary embodiment of the invention, storing the public key on the electronic device, sending the public key and the unique identifier to another electronic device, and authenticating the electronic device by using an asymmetric proof algorithm. In particular, the electronic device may be an electronic device according to an exemplary embodiment.

According to an exemplary embodiment a program element is provided, which, when being executed by a processor, is adapted to control or carry out a method of generating a public key, wherein the method comprises generating a public key based on a private key and a unique identifier associated with the electronic device.

According to an exemplary embodiment a computer-readable medium is provided, in which a computer program is stored which, when being executed by a processor, is adapted to control or carry out a method of generating a public key, wherein the method comprises generating a public key based on a private key and a unique identifier associated with the electronic device.

In this application the term "public key" may particularly denote a key for an authentication method which is published and which may be used to authenticate an entity in this authentication method. Such a public key may be generated based on a base element or base point of an asymmetric proof algorithm, for example. Furthermore, a certificate for this public key may be issued by a trusted party.

In this application the term "private key" or "secret key" may particularly denote a key which is not published and which is associated with an entity to be authenticated.

In this application the term "unique identifier" may particularly denote any unique number which is associated with the entity to be authenticated, e.g. an identification number or a serial number of an electronic device.

By generating a public key based on a private key and a unique identifier it may be possible to use a significantly shorter key, e.g. fewer bits, than known in common asymmetric proof protocols, like Zero Knowledge Proofs of Knowledge, while almost keeping the security level compared to standard use of Zero Knowledge Proofs of Knowledge protocols. In an abstract point of view it may be said that a base point or base element, which may then be used in all computations in an authentication protocol or algorithm, is diversified by the unique identifier, e.g. a serial number, of the proving entity, e.g. an electronic device.

The use of such a public key, generated using a diversified base point, may be sound since from a mathematical point of view the algorithm is primarily only changed by sending the number bits of the secret or private key or secret exponent in the computation of the public key. Since every electronic device makes use of another base point, due to the using of the unique identifier in generating the public key, an attacker may not mount a general attack on the whole system, i.e. breaking the discrete logarithm assumption for the commonly used base point by storing a number of reference points and using the so-called baby-step-giant-step algorithm, for example. On contrary, the attacker may need to mount different attacks on different electronic devices, e.g. security tokens. Therefore, attacking more than one token may be considerably more difficult than in standard system.

Furthermore, the performance of a system using an authentication method based on a public key generation according to an exemplary embodiment may be increased, since the computational effort may be reduced, since the electronic device may always use the same diversified base point and hence may use a significantly shorter key and random number as in standard systems. The reader side may have to compute a new base point for every electronic device, like a security token, however the computational effort may be substantially the same as in a standard system. In particular, an asymmetric key according to an exemplary embodiment may be easily implemented into electronic devices, e.g. a security token, since by using a diversified base point it may be possible to use a smaller key to achieve the same security level than in standard asymmetric key algorithms.

Next, further exemplary embodiments of the method of generating a public key are described. However, these embodiments also apply to the electronic device, the authentication method, the program element, and the computer-readable medium.

According to another exemplary embodiment the method further comprises generating a secondary base point for the generating of the public key by using a primary base point. In particular, the secondary base point may be calculated or generated on base of the unique identifier associated with the electronic device. The unique identifier may be an identification number or serial number of the electronic device which may be a security token, e.g. in the form of a smart card or of a USB security token.

Since the generation of the secondary base point may be based on the primary base point and the unique identifier each electronic device may generate its own unequivocal base point, which may lead to an increased security concerning a general attack on an authentication algorithm using such public keys and/or base points.

According to another exemplary embodiment of the method the primary base point is a base point over a prime field or elliptic curves. More generally, every mathematical group can be used in which the discrete logarithm problem is hard to solve. Using such groups may increase the security of the protocol using the generated public key or base point.

According to another exemplary embodiment of the method the public key is calculated according to the following equation:

$$y = g'^x,$$

wherein: y denotes the public key,
denote the private key,
g' denote the secondary base point and is calculated according $g' = g^{ID}$,
wherein: ID denotes the serial identification number, and g denotes the primary base point.

Next, further exemplary embodiments of the electronic device are described. However, these embodiments also apply to the method of generating a public key, the authentication method, the program element, and the computer-readable medium.

According to another exemplary embodiment of the electronic device the memory is further adapted to store its unique identifier and a certificate for the public key. In particular, the unique identifier and the certificate may be stored in the memory. In many cases the electronic device may be a security token.

In case the electronic device is a security token it may be possible to use a potentially serial number infrastructure already existing. That is, it may be assumable that for every transaction the security token transmits its serial number to the reader in order to identify. Thus, the use of the serial number may be an efficient way to diversify the used base point of an asymmetric proof algorithm.

Next, further exemplary embodiments of the authentication method are described. However, these embodiments also apply to the method of generating a public key, the electronic device, the program element, and the computer-readable medium.

According to another exemplary embodiment of the authentication method the asymmetric proof algorithm is a Zero Knowledge Proof of Knowledge algorithm. In particular, the Zero Knowledge Proof of Knowledge algorithm is an ElGamal type encryption scheme.

The using of a Zero Knowledge Proof of Knowledge algorithm, e.g. an ElGamal type encryption scheme, may ensure a high level of security, since these algorithms belong to the most secure class of asymmetric proofs.

According to another exemplary embodiment the authentication method further comprises calculating a secondary base point based on the unique identifier.

Summarizing, a gist of an exemplary aspect of the present invention may be seen in diversifying system parameters, e.g. the base point, the private key and/or the public key, of a Zero Knowledge Proof of Knowledge algorithm, by using the already existing serial number infrastructure for the security token. Thus, from an abstract point of view a chance with respect to known Zero Knowledge Proof of Knowledge algorithms, e.g. a standard ElGamal type algorithm, is the diversification of this ElGamal type algorithm by the use of the serial number of the security token. More specifically, the base point or base element g used for all computations in the protocol or algorithm is diversified by this serial number. Thus, for each security token a new base point may be used.

The aspects and exemplary embodiments defined above and further aspects of the invention are apparent from the example of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
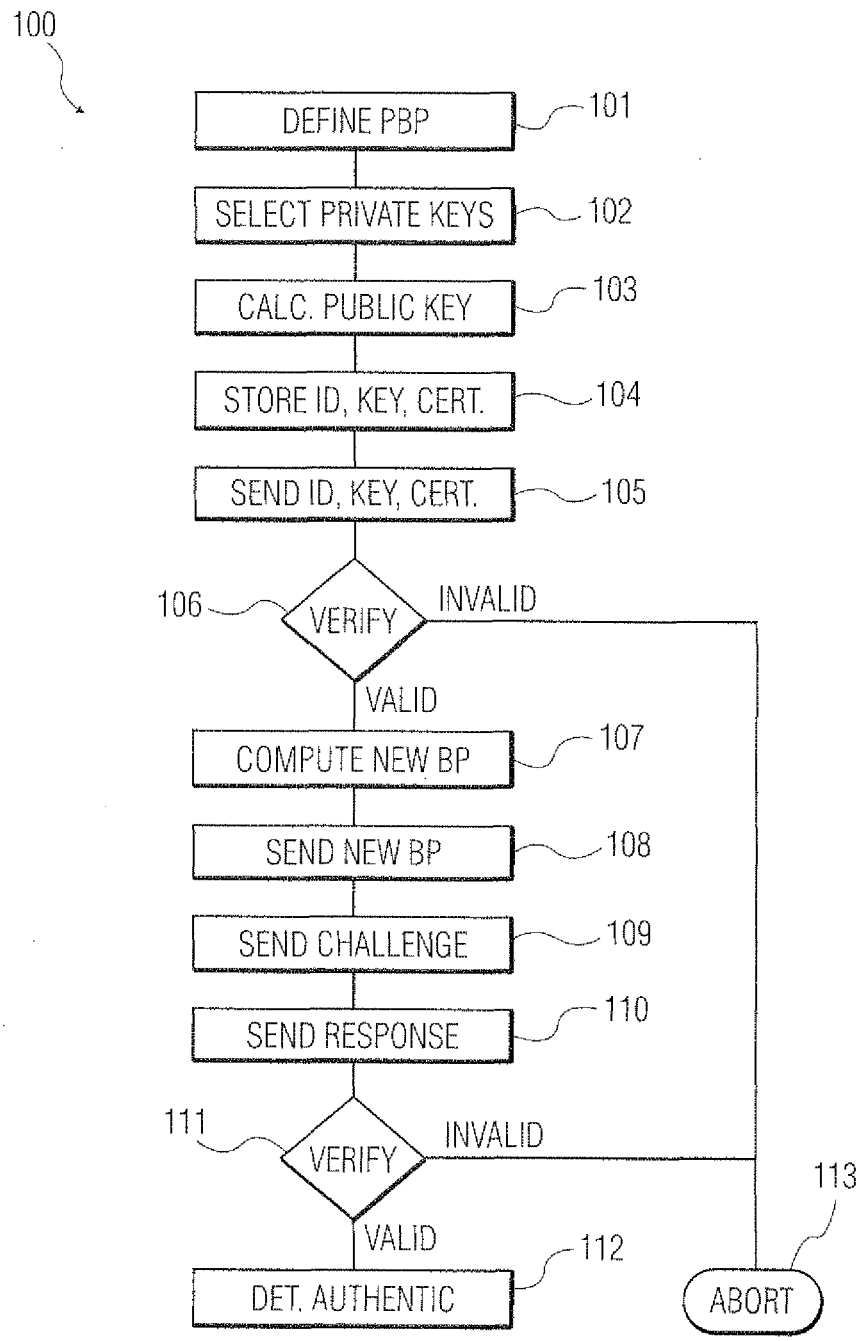
FIG. 1 schematically illustrates a flow chart of an authentication method according to an exemplary embodiment.

The illustration in the drawing is schematically. In different drawings, similar or identical elements are provided with the same reference signs.

In the following an authentication method 100 based on a Zero Knowledge Proof of Knowledge protocol according to an exemplary embodiment will be described in more detail with reference to the flow chart of FIG. 1.

In a first step 101 a manufacturer defines a primary base point g of a mathematical group G, e.g. on an elliptic curve. In a next step 102 a private key x is chosen for every security token A having a serial number ID. Afterwards a public key y is calculated 103 according $g'=g^{ID}$ and $y=g'^x$, wherein g' represents a secondary base point which is unique for every security token, since ID is unique for every security token. Then the serial number ID, the public key y and a certificate for y is stored on the security token 104. The certificate may be issued for example by the security token's manufacturer or any other trusted third party in the authentication system.

For authentication the security token A sends its serial number ID, its public key y and the certificate to a reader B 105. The reader B verifies the certificate 106 and in case of a valid certificate B computes $g'=g^{ID}$ 107 as the base point for the following protocol. In case the certificate is not valid the authentication method aborts 113. Furthermore, A chooses a number r, computes $g'^r$ and sends the results to the reader B 108. After receiving the result of $g'^r$ B randomly chooses a challenge c and sends the challenge c to the security token A 109. Then A computes $$resp=(r+c\cdot ID\cdot x) \bmod n,$$

wherein n is the order of the mathematical group G, and sends resp to B 110. In a next step B verifies the response resp by checking whether $g'^{resp}$ equals $g'^r \cdot y^c$ 111. In case the verification is positive the security token A is authentic 112. In case the verification is not positive the security token A is not authentic 113.

An algorithm according to an exemplary embodiment may be used in every system where a serial number infrastructure exists and a strong cryptographic proof of authenticity is needed. Assuming a token reader system where every security token is equipped with a unique 8 byte serial number an actual implementation may have the following steps:

A manufacturer of the security tokens defines a cryptographic system based on elliptic curves, i.e. the manufacturer publishes the parameters of an elliptic curve, a base point g and its public key for certificate verification. To have a reasonable level of security parameters of 160 bits may be chosen. Elliptic curve cryptography using 160 bits are typically considered to be even good enough for qualified digital signatures. Thus, it may be possible to choose even shorter values than 160 bits, since the security level may not need to be so high. In both, security token and readers, an algorithm to perform point multiplication on elliptic curves may be implemented.

For every security token the manufacturer may generate a Unique Identification (UID), a secret key y, may compute or generate a public key $y=g^{UID*x}$ and may issue a certificate for y, i.e. the manufacturer signs y with his own private key. Assuming 8 bytes for the UID and a very high security level of 160 bits, the secret key may have 96 bits and the corresponding key may have 160 bits.

Whenever an entity wants to proof for the originality of the security token, the entity performs the protocol described with reference to the flow chart shown in FIG. 1. If the security token passes the test, it is original, if it fails then it is not. The protocol is correct since an attacker who can properly reply to every challenge c "knows" the private exponent.

Figure 2:
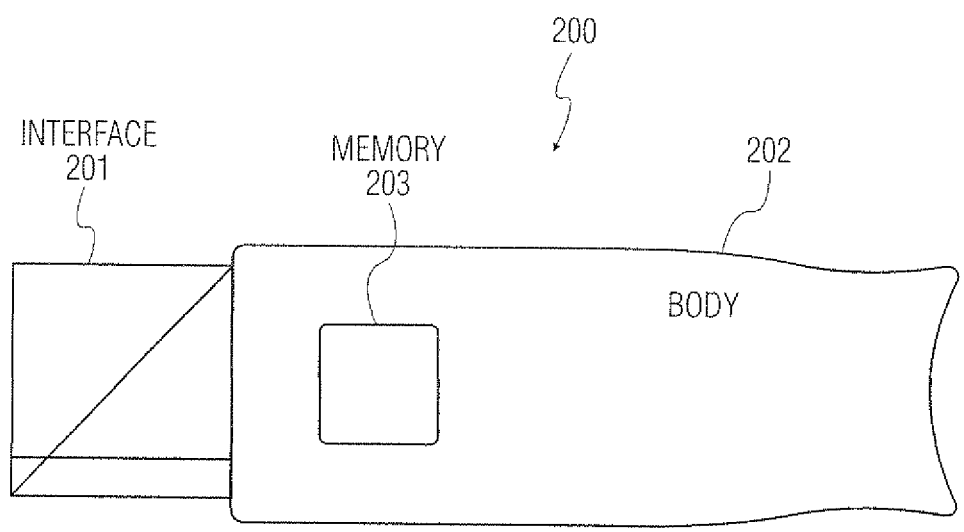
FIG. 2 schematically illustrates a security token.

FIG. 2 schematically illustrates a security token. Such a security token may be a smart card or a USB security token. In particular, FIG. 2 shows a schematically USB security token 200. The USB security token 200 comprises an interface portion 201 adapted to be plugged to a USB port of a reading device and a body 202 building a housing for integrated circuits being part of the security token 200. In particular, a memory 203 is schematically depicted in FIG. 2 in which a private key, a base point for an authentication algorithm, a public key, a certificate for the public key, a serial number UID, and further data may be stored.

Finally, it should be noted that the above-mentioned embodiments illustrate rather then limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method for generating a public key for an electronic device, the method comprising:
   receiving a unique serial number from the electronic device, wherein a private key is chosen for the unique serial number;
   generating a public key based on both the private key and the received serial number, wherein the received serial number diversifies a primary base point;
   storing the generated public key, the unique serial number, and a certificate in a memory in the electronic device; and
   authenticating the electronic device by sending the stored public key, the stored serial number, and the stored certificate to a reader, wherein the reader is configured to verify the certificate.

2. The method according to claim 1, further comprising:
   generating a secondary base point based on both the primary base point and the unique serial number.

3. The method according to claim 1, wherein the primary base point is a base point over a prime field or elliptic curves.

4. The method according to claim 1, further comprising:
   calculating a secondary base point g' according to $g'=g^{ID}$, wherein ID denotes the unique serial number, and g denotes the primary base point; and
   calculating the public key y according to $y=g'^x$, wherein y denotes the public key and x denotes the private key.

5. The method according to claim 1, further comprising:
   authenticating the electronic device by using an asymmetric proof algorithm.

6. The method according to claim 5, wherein the asymmetric proof algorithm is a Zero Knowledge Proof of Knowledge algorithm.

7. The method according to claim 6, wherein the Zero Knowledge Proof of Knowledge algorithm is an ElGamal type encryption scheme.

8. The method of claim 1, wherein the primary base point is defined by a manufacturer.

9. The method of claim 1, further comprising:
   determining whether $g'^{resp}$ matches $g'^r \cdot y^c$.

10. The method of claim 9, further comprising:
    when $g'^{resp}$ matches $g'^r \cdot y^c$, authenticating the electronic device.

11. The method of claim 1, wherein the electronic device is a security token.

12. The method of claim 11, wherein the security token is a smart card.

13. The method of claim 11, wherein the security token is a USB security token.

14. A non-transitory computer-readable medium, in which a computer program is stored which, when being executed by a processor, authenticates an electronic device, the non-transitory computer readable medium comprising:
  instructions for receiving a unique serial number from the electronic device, wherein a private key is chosen for the unique serial number;
  instructions for generating a public key based on both the private key and the received serial number, wherein the received serial number diversifies a primary base point;
  instructions for storing the generated public key, the unique serial number, and a certificate in a memory in the electronic device; and
  instructions for authenticating the electronic device by sending the stored public key, the stored serial number, and the stored certificate to a reader, wherein the reader is configured to verify the certificate.

\* \* \* \* \*